United States Patent [19]

Clay

[11] Patent Number: 5,464,231
[45] Date of Patent: Nov. 7, 1995

[54] CHUCK WITH JAWS HAVING CURVED ENGAGEMENT SURFACES

[76] Inventor: Tymen Clay, 241 Monteith Avenue, Stratford, Ontario, Canada, N5A 2P6

[21] Appl. No.: 262,229

[22] Filed: Jun. 20, 1994

[51] Int. Cl.$^6$ .................................................. B23B 31/16
[52] U.S. Cl. .......................................... 279/123; 269/268
[58] Field of Search ..................................... 279/123, 124; 269/257, 265, 268–270

[56] References Cited

U.S. PATENT DOCUMENTS

| | | | |
|---|---|---|---|
| 1,621,805 | 3/1927 | Nasett | 269/270 |
| 2,757,008 | 7/1956 | Lane . | |
| 3,494,627 | 2/1970 | Pirman . | |
| 3,595,593 | 7/1971 | Gold . | |
| 3,603,605 | 9/1971 | Webster . | |
| 3,945,654 | 3/1976 | McMullen . | |
| 4,630,836 | 12/1986 | Hunger et al. . | |
| 5,141,239 | 8/1992 | Clay | 279/123 |

FOREIGN PATENT DOCUMENTS 1215470  4/1966  Germany .

OTHER PUBLICATIONS

Nova 4 Jaw Self Centering Scroll Chuck published by teknatool International, prior to 1993, 2 pages.

*Primary Examiner*—Steven C. Bishop
*Attorney, Agent, or Firm*—Baker & Daniels

[57] ABSTRACT

A chuck for holding a workpiece in a machine such as a lathe including a jaw holder having a front side facing in the direction of the workpiece and radially extending slots in this front side. There is a mechanism for attaching the holder to the machine for turning about a central axis. Several jaw devices are detachably mounted in these slots and are radially movable therein. Each jaw device has an inner workpiece engaging surface that forms a profile when it is viewed from the front of the jaw device in the direction of the central axis. This profile comprises a central concave arc and two similar convex curves located at opposite ends of the concave arc. In a preferred version, the chuck is a scroll chuck having a scroll member rotatably mounted in the holder. The workpiece engaging surfaces can be serrated to increase gripping ability.

17 Claims, 3 Drawing Sheets

CHUCK WITH JAWS HAVING CURVED ENGAGEMENT SURFACES

BACKGROUND OF THE INVENTION

This invention relates to chucks for holding a workpiece in a machine such as a lathe.

A variety of chucks or gripping devices are known in the machine and tool industry for holding a workpiece or a tool bit. Many of these chucks have movable or sliding jaws which can be moved radially inwardly or outwardly in order to hold or grip the end of a workpiece or a tool bit. These jaws are sometimes moved by means of a special tool or key that is turned manually.

One common form of chuck used with a lathe is called a scroll chuck which can be of the self-centering type. Although the number of jaws in chucks of this type can vary, in many cases these chucks are equipped with three or four jaws that can be moved radially inwardly or outwardly by means of an annular scroll member that is turned about a central axis in order to manoeuvre the jaws. Scroll chucks have several advantages including versatility and ease of use. One form of improved scroll chuck is that disclosed in and illustrated in applicant's own U.S. Pat. No. 5,141,239 which issued Aug. 25, 1992, the disclosure of which is incorporated herein by reference. With this improved scroll chuck the possibility of one or more of the jaws of the chuck becoming accidentally disengaged is substantially reduced.

U.S. Pat. No. 4,630,836 issued Dec. 23, 1986 to Hilti Aktiengesellschaft describes a chuck suitable for use in a drill such as a hammer drill, which chuck has clamping jaws to secure a tool. These jaws each have a convex surface transverse to the chuck axis. The more radially inward portion of the convex surface has a V-shaped notch extending in the axial direction of the chuck and this notch forms a pair of spaced edges which are said to grip the surface of the tool so that it can be reliably rotated. In the illustrated version of this chuck, there are three clamping jaws.

It is an object of the present invention to provide an improved chuck for holding a workpiece in the machine wherein the jaw devices are provided with an unique improved profile that provides better gripping or holding power, whether the workpiece be round or square in cross-section.

It is a further object of the present invention to provide a chuck for holding a workpiece which has improved jaw devices that can be readily manufactured without undue difficulty and that are easy to use when working with a machine such as a lathe.

SUMMARY OF THE INVENTION

According to one aspect of the invention, a chuck for holding a workpiece in a lathe includes a jaw holder having a front side facing in the direction of the workpiece, at least four radially extending slots in this front side, and means for attaching the holder to the lathe for turning about a central chuck axis. At least four jaw devices are detachably mounted in these slots of the holder and are radially movable therein. Each jaw device has an inner workpiece engaging surface that forms a profile when it is viewed from the front of the jaw device in the direction of the central chuck axis. This profile comprises a central concave arc and two similar convex curves located at opposite ends of the concave arc. There are also means for moving the jaw devices radially inwardly or outwardly.

In one preferred embodiment, the chuck is a scroll chuck having a scroll member rotatably mounted on the holder, which member has a spiral-shaped rib formed on the front surface thereof. This rib extends along recesses formed on the jaw devices.

According to another aspect of the invention, a chuck for holding a workpiece in a lathe includes a jaw holder having a front side facing in the direction of the workpiece and a mechanism for mounting the holder in or to the lathe for turning about a central chuck axis. At least four jaw devices are mounted for radial movement inwardly or outwardly in the holder. Each of these devices has a workpiece engaging surface that faces radially inwardly towards the central chuck axis and that forms a profile when it is viewed from the front of the chuck in the direction of the central chuck axis. The profile comprises a central concave arc and two convex curves located at opposite ends of this arc. There are also means for mounting the jaw devices for radial movement in the holder.

Further features and advantages will become apparent from the following detail taken in conjunction with the on accompanying drawings.

DETAILED DESCRIPTION OF PREFERRED EMBODIMENT

Figure 1:
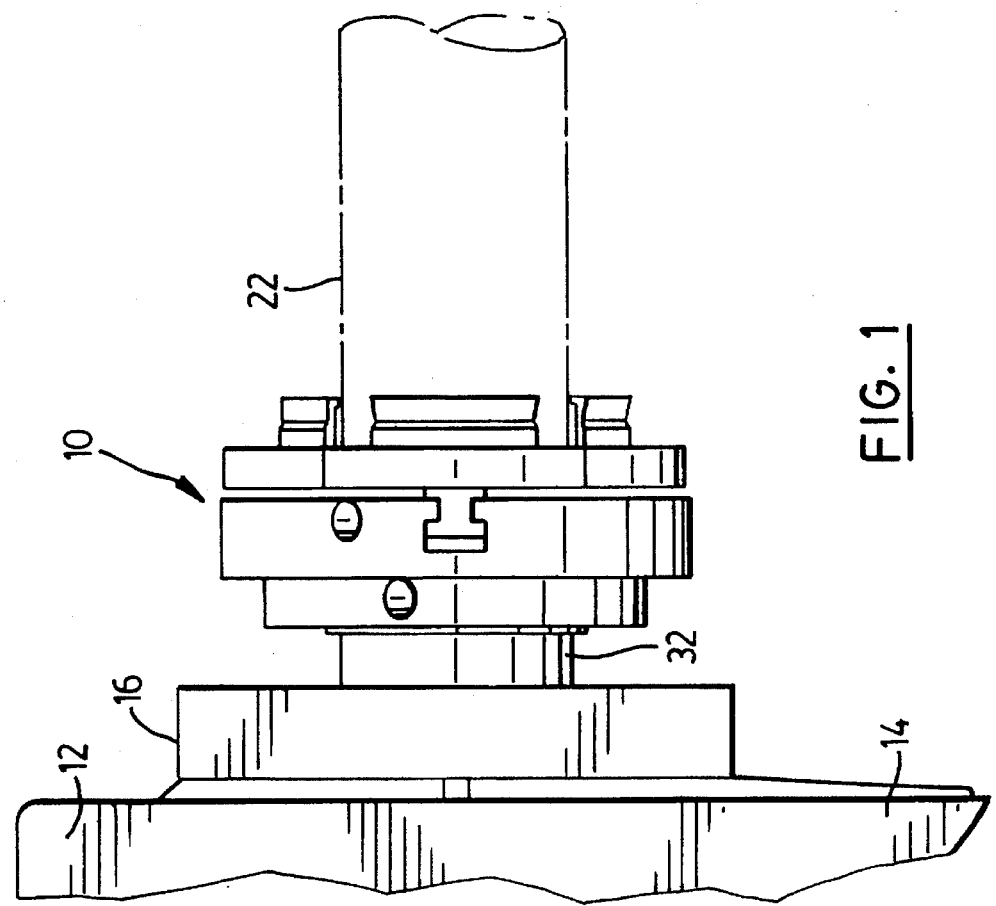
FIG. 1 is a side view of scroll chuck constructed in accordance with the invention mounted on a lathe, only a portion of which is shown.

As shown in FIG. 1, a scroll chuck 10 constructed in accordance with the invention is mounted on a rotatable shaft of a lathe 12. Only a portion of the lathe housing 14 is shown in FIG. 1. The lathe shaft extends outwardly from the centre of the bearing support 16. The lathe itself is of the usual construction and forms no part of the present invention. The projecting end of the shaft of the lathe can be threaded for attachment to the scroll chuck 10.

The illustrated scroll chuck 10 includes a jaw holder 18 having a front side 20 facing in the direction of the workpiece 22. The illustrated holder has four radially extending slots 26 to 29 but it will be understood that the holder of the present chuck can have as many as six or more slots depending upon the number of jaws or jaw devices in the scroll chuck. The slots extend to a circular central opening 30. The holder includes means for attaching the holder to the lathe for turning about a central chuck axis. The illustrated attaching means comprises a sleeve section 32 which is internally threaded at 34 for attachment to the shaft of the lathe. A small threaded opening 36 can be provided for a set screw to secure the chuck in place.

Figure 3:
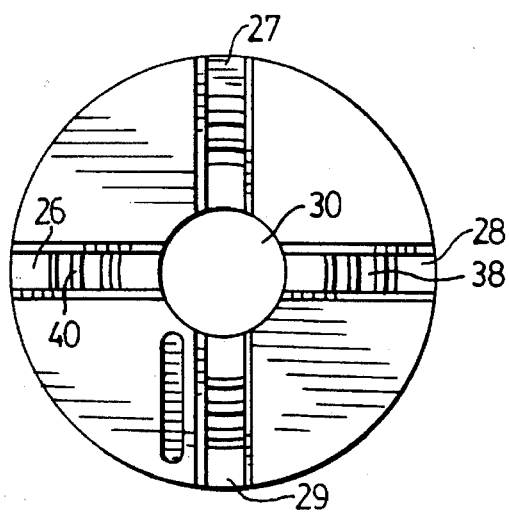
FIG. 3 is a front view of the jaw holder from which the four jaws that are shown in FIG. 2 have been removed for purposes of illustration.
Figure 4:
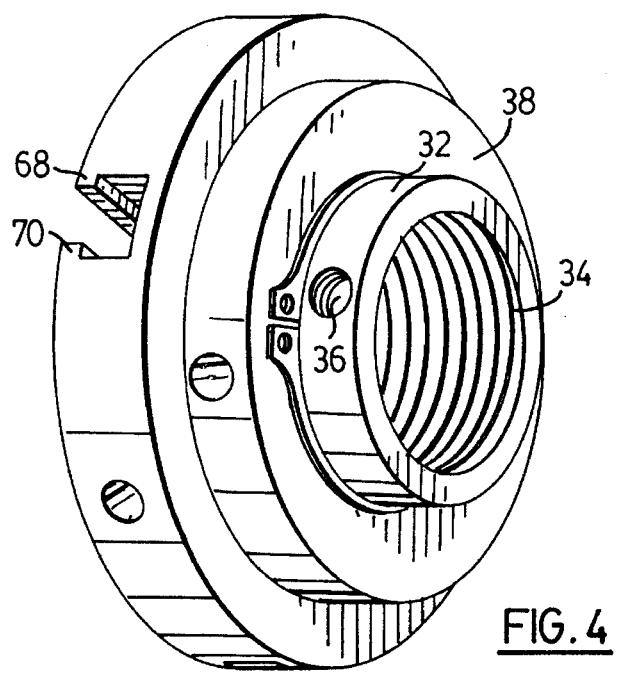
FIG. 4 is a perspective view showing the rear side of the jaw holder of FIG. 3.

A scroll member 38 of known construction is rotatably mounted on the sleeve section 32. This member has a spiral-shaped rib 40, portions of which can be seen through the radial slots of the holder in FIG. 3. This rib is formed on a front surface of the scroll member 38 and it engages the jaw devices so that rotation of the scroll member about the central chuck axis causes the jaw devices to move radially inwardly or outwardly.

Figure 2:
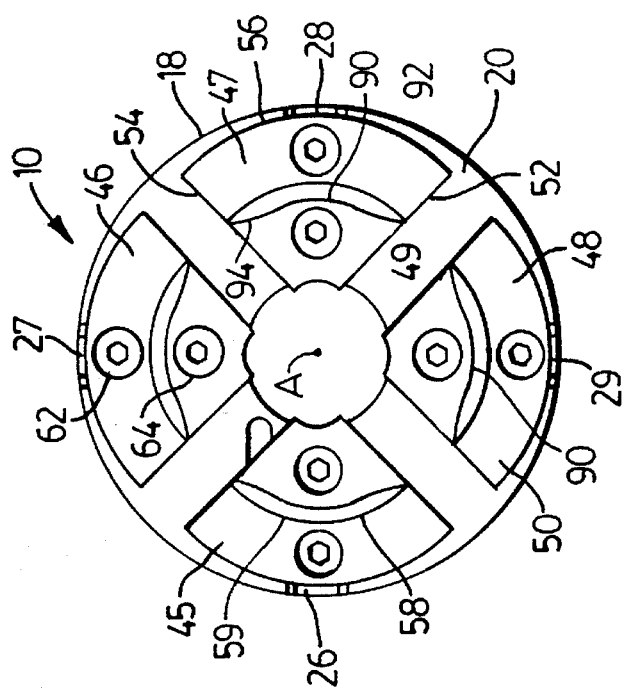
FIG. 2 is a front view of the scroll chuck provided with the improvement of the invention.

In the illustrated scroll chuck there are four jaw devices 45 to 48. Except for the novel profile of workpiece engaging surfaces 49, the jaw devices can be constructed in a known manner and are very similar to one another. The construction of these jaw devices will be described with references to FIGS. 2, 5 and 6, the latter two figures illustrating the jaw identified by reference 48. Each device is detachably mounted in its respective slot and is radially movable therein. Preferably each jaw device comprises a first jaw member 50 which is the portion which is seen in FIG. 2. The first jaw member is located forwardly of the jaw holder 18. As shown, each jaw device has two substantially radially extending sidewalls 52 and 54. It also has an arc-shaped outer sidewall 56 which extends between the two sidewalls 52 and 54. The first jaw member has a forwardly extending flange 58 which is used to grip the workpiece. This flange has an outer surface at 59 located opposite the workpiece engaging surface 49, which outer surface forms a convex circular arc. The workpiece engaging surface 49 is formed on this flange 58 and this surface faces radially inwardly towards the central chuck axis indicated at A in FIG. 2.

There is also a second jaw member 60 which is detachably connected to the first jaw member by means of two screws 62 and 64. These screws extend into suitable threaded holes formed in the second jaw member. This second jaw member is located in the respective slot of the jaw holder and is slidable therein. The radially extending sides of the second jaw member are formed with grooves 66. In these jaws are positioned two edge flanges 68 and 70 that extend along each slot of the jaw holder and that retain the jaw member 60 in this slot. There are formed on the bottom or rear surface of each jaw member 60 several slightly curved recesses 72. The aforementioned rib 40 on the scroll member extends along these recesses so that rotation of the rib about the central axis forces the jaw devices either inwardly or outwardly. As explained in the present applicant's U.S. Pat. No. 5,141,239, the scroll chuck is preferably provided with jaw retention means which can include pin member 80. As this jaw retention means forms no part of the present invention, a detailed description thereof is deemed unnecessary in the present application.

Figure 7:
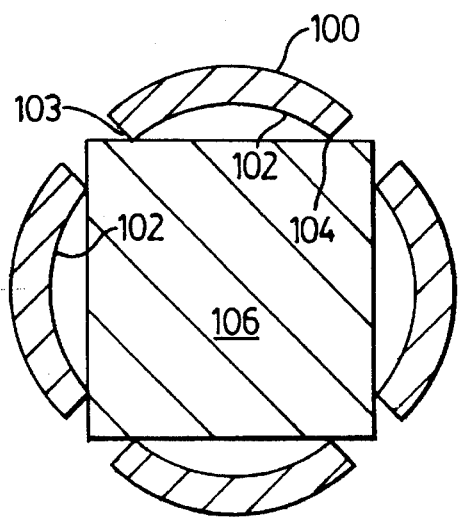
FIG. 7 is a schematic illustration showing the frontal profile of known chuck jaws showing the manner in which these jaws grip a workpiece having a square cross-section.

The workpiece engaging surface 49 forms a profile when it is viewed from the front of the jaw device in the direction of the central chuck axis A, this profile being shown in FIGS. 2 and 8 to 11. The profile comprises a central concave arc 90 and two similar convex curves 92 and 94 located at opposite ends of the concave arc 90. The advantages of this curved profile for the workpiece engaging surface of the jaw can be seen from FIGS. 7 to 11 of the drawings. FIG. 7 illustrates the profile of the workpiece engaging flanges of a prior art chuck, such as the one shown in applicant's own U.S. Pat. No. 5,141,239. In this prior art chuck, the flanges 100 are in the form of circular arcs with each flange having a concave inner surface 102. This inner surface terminates in sharp angle corners at 103 and 104. With these traditional style jaws therefor, the workpiece 106 which has a square profile is engaged on each of its four sides by only the corners 103 and 104 of each device. The holding power for such a chuck in this situation is quite low and even relatively small digs into the workpiece can knock it loose.

Figure 8:
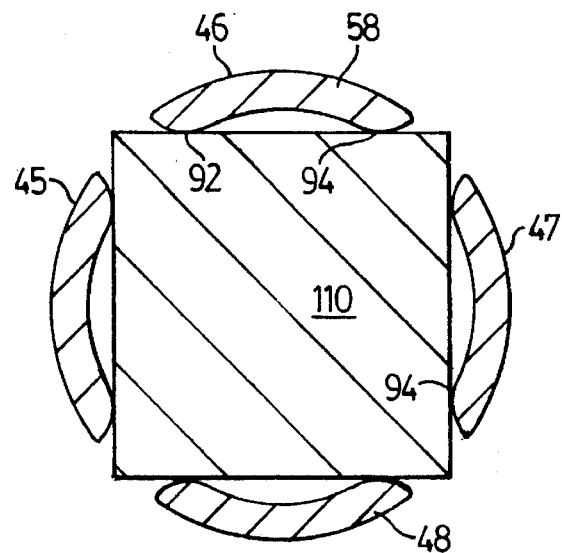
FIG. 8 is a schematic view similar to FIG. 7 but showing how the four jaws of a chuck constructed in accordance with the invention grip a workpiece having a square cross-section.

FIG. 8 illustrates how a chuck 10 constructed in accordance with the invention is able to provide improved gripping of the workpiece 110 which has a square cross-section. With the chuck of the invention, each of the jaw devices 45 to 48 engages its respective side of the workpiece along the opposite end portions of the flange 58, that is, in the region of the convex curves 92 and 94. Because of the use of these convex curves a relatively large surface area of the jaw device engages the side of the workpiece and this results in high holding power and excellent security.

Figure 9:
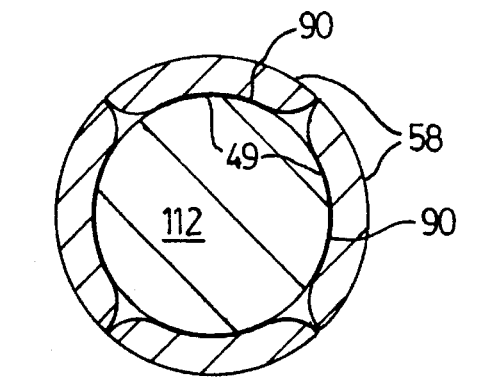
FIG. 9 is a schematic illustration showing how the jaws of the present chuck engage a tubular or round workpiece having a diameter corresponding to the nominal diameter of the chuck.
Figure 10:
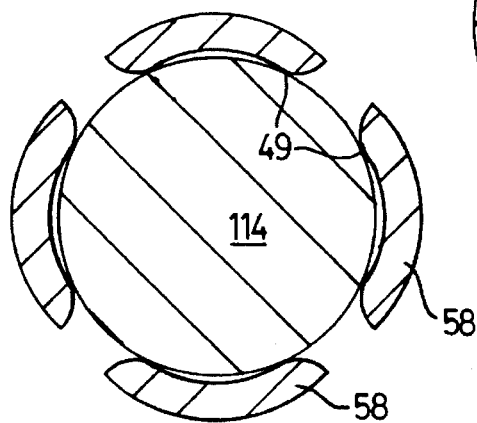
FIG. 10 is a schematic illustration similar to FIG. 9 but showing how the same jaws of the chuck engage a workpiece having a circular cross-section with a diameter of intermediate length.
Figure 11:
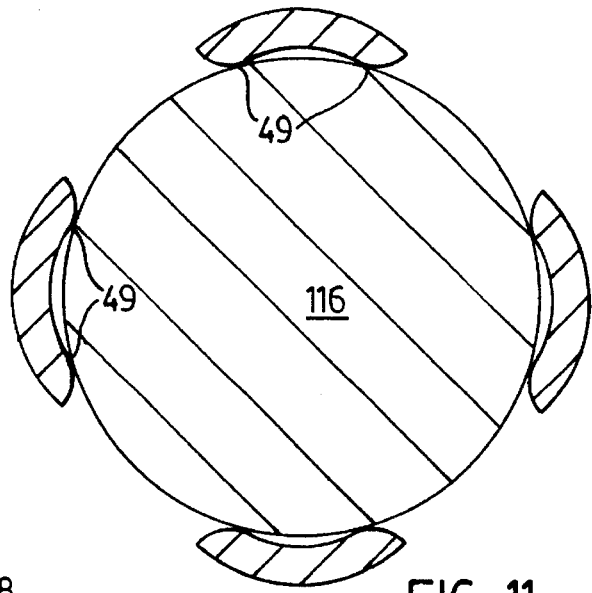
FIG. 11 is a schematic illustration similar to those of FIG. 9 and 10 but showing the chuck jaws of the invention gripping a workpiece having a round cross-section with the maximum diameter that can be held by the chuck.

The profile of the workpiece engaging surfaces in the chuck of the invention provides much better holding power for round workpieces as well as the aforementioned square workpieces and this advantage is illustrated in FIG. 9 to 11.

In FIG. 9, the four flanges 58 of the jaw devices engage a minimum diameter round workpiece 112. In this position, the jaw devices are at their radially innermost position and the workpiece engaging surfaces 49 contact the exterior of the workpiece closely for a substantial circumferential distance on all four sides. At this so called "nominal diameter" jaw devices constructed in accordance with the invention grip as well as the traditional jaw design, that is the design shown in FIG. 7.

With a somewhat larger or intermediate diameter workpiece such as the workpiece 114 shown in FIG. 10, the workpiece engaging surfaces 49 of the jaw devices are still able to grip the workpiece with a relatively large surface area and thus the jaw devices are capable of providing good holding power. This is not the case with the traditional jaw design which, with this diameter workpiece, would have a much smaller contact area between the jaws and the sides of the workpiece. This is because only the end edges 103 and 104 of each jaw device engage a side of the workpiece.

With a maximum diameter workpiece such as the workpiece 116 shown in FIG. 11, the curved workpiece engaging surfaces 49 still provide a good grip as there is a relatively large surface area of each jaw device engaging the side of the workpiece. Again, if the previously known jaw design shown in FIG. 7 were used, these jaws would grip the sides of the workpiece only with their corners, resulting in poor holding power compared to that of the jaw devices of the invention.

Figure 5:
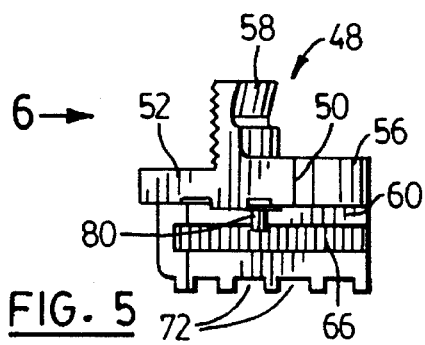
FIG. 5 is a side elevation of a single jaw device constructed in accordance with the invention.
Figure 6:
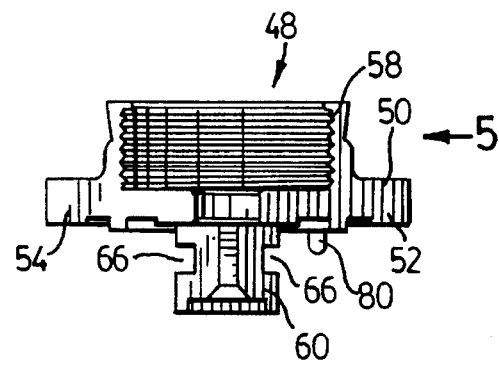
FIG. 6 is another view of the jaw device of FIG. 5 taken from the left hand side of FIG. 5.

In order to provide even better holding power with a chuck constructed in accordance with the invention, each workpiece engaging surface can be serrated as illustrated in FIGS. 5 and 6. In other words, the workpiece engaging surface is formed with a series of side-by-side teeth 120, which teeth extend along the inside of each flange 58 in planes perpendicular to the central chuck axis.

As indicated, FIG. 9 illustrates the jaw device 45 to 48 when they are moved to an innermost position where adjacent ends of adjacent jaw devices contact one another. Preferably, in this innermost position, the central concave arcs 90 are circular arcs of the same circle centered on the central chuck axis. In this way, excellent gripping power is provided by the chuck at its nominal diameter.

It will be apparent to one skilled in the art that various modifications and changes could be made to the illustrated and described chuck without departing from the spirit and scope of this invention. Accordingly, all such modifications and changes as fall within the scope of the appended claims are intended to be part of this invention. It is also possible of course to mount these curved jaws on cam operated or other chucks where the jaws can be either independent or synchronizly operated.

I therefore claim:

1. A chuck for holding a workpiece in a lathe, said chuck comprising:

a jaw holder having a front side facing in the direction of the workpiece, at least four radially extending slots in said front side, and means for attaching said holder to said lathe for turning about a centre chuck axis;

at least four jaw devices detachably mounted in respective slots of said holder and radially movable therein, each jaw device having an inner workpiece engaging surface that forms a profile when it is viewed from the front of the jaw device in the direction of said central chuck axis, said profile comprising a central concave arc and two similar convex curves located at opposite ends of said concave arc, and means for moving said jaw devices radially inwardly or outwardly.

2. A chuck according to claim 1 wherein said chuck is a scroll chuck and said moving means comprises a scroll member rotatably mounted on said holder and having a spiral-shaped rib formed on a front surface thereof, said rib extending along recesses formed on said jaw devices.

3. A chuck according to claim 1 wherein each jaw device comprises a first jaw member located forwardly of said jaw holder and outside the adjacent slot and a second jaw member detachably connected to said first jaw member and located in the respective slot.

4. A chuck according to claim 1 wherein there are four of said jaw devices and four of said slots and said jaw devices are equally spaced around a circular front section of said jaw holder.

5. A chuck according to claim 1 wherein each jaw device includes an outer surface located opposite said workpiece engaging surface and said outer surface forms a convex circular arc.

6. A chuck according to claim 1 wherein the workpiece engaging surface of each jaw device is serrated with a number of side-by-side notches to increase the gripping ability of the jaw device.

7. A chuck according to claim 1 wherein said jaw devices can be moved to an innermost position where adjacent ends of adjacent jaw devices contact one another and, in said innermost position, the central concave arcs of the jaw devices are circular arcs of the same circle centered on said central axis.

8. A chuck according to claim 2 wherein each jaw device comprises a first jaw member located forwardly of said jaw holder and outside the adjacent slot and a second jaw member detachably connected to said first jaw member and located in the respective slot.

9. A chuck according to claim 8 wherein there are four of said jaw devices and four of said slots and said jaw devices are equally spaced around a circular front section of said jaw holder.

10. A chuck according to claim 9 wherein the workpiece engaging surface of each jaw device is serrated with a number of notches to increase the gripping ability of the jaw device.

11. A chuck for holding a workpiece in a lathe, said chuck comprising:

a jaw holder having a front side facing in the direction of the workpiece and means for mounting the holder in or to said lathe for turning about a central chuck axis of the jaw holder;

at least four jaw devices mounted for radial movement inwardly or outwardly in said jaw holder, each jaw device having a workpiece engaging surface that faces radially inwardly towards said central chuck axis and that forms a profile when it is viewed from the front of the chuck in the direction of said central chuck axis, said profile comprising a central concave arc and two convex curves located at opposite ends of said convex arc; and means for mounting said jaw devices for radial movement in said jaw holder.

12. A chuck according to claim 11 including means for moving said jaw devices radially inwardly or outwardly and wherein each jaw device has a forwardly projecting, curved flange, said workpiece engaging surface being provided by said flange.

13. A chuck according to claim 11 wherein there are four of said jaw devices which have the same profile for their workpiece engaging surfaces.

14. A chuck according to claim 12 wherein said chuck is a scroll chuck and said moving means comprises a scroll member rotatably mounted on said holder and having a spiral-shaped rib formed on a front surface thereof, said rib extending along recesses formed on said jaw devices.

15. A chuck according to claim 14 wherein said mounting means comprises radially extending slots in said front side and each jaw device comprises a first jaw member located forwardly of said jaw holder and outside the adjacent slot and a second jaw member detachably connected to said first jaw member and located in the respective slot.

16. A chuck according to claim 15 wherein the workpiece engaging surface of each jaw device is serrated with a number of side-by-side notches to increase the gripping ability of the jaw device.

17. A chuck according to claim 15 wherein said jaw devices and said slots are equally, circumferentially spaced around a circular front section of said jaw holder.

* * * * *